United States Patent [19]
Gum et al.

[11] Patent Number: 5,817,356
[45] Date of Patent: Oct. 6, 1998

[54] PREPARATION OF PASTAS

[75] Inventors: Ernest Kemp Gum, New Fairfield; Jau Yann Hsu, Brookfield, both of Conn.; Hyung Wook Kim, Irvington, N.Y.; Elaine Regina Wedral, Sherman, Conn.

[73] Assignee: Nestec S.A., Vevey, Switzerland

[21] Appl. No.: 645,462

[22] Filed: May 13, 1996

[51] Int. Cl.$^6$ .................................................. A23L 1/16
[52] U.S. Cl. ...................... 426/325; 426/324; 426/326; 426/557; 426/412; 426/811; 426/418
[58] Field of Search .................... 426/557, 324–326, 426/321, 335, 412, 811, 418

[56] References Cited

U.S. PATENT DOCUMENTS

| | | | |
|---|---|---|---|
| 4,262,027 | 4/1981 | Tonner et al. | 426/325 |
| 4,540,590 | 9/1985 | Harada et al. | 426/324 |
| 4,552,772 | 11/1985 | Saitoh | 426/557 |
| 4,597,976 | 7/1986 | Doster et al. | 426/325 |
| 4,659,576 | 4/1987 | Dahle et al. | 426/324 |
| 4,734,291 | 3/1988 | Raffensperger | 426/325 |
| 4,828,852 | 5/1989 | Hsu et al. | 426/557 |
| 4,876,104 | 10/1989 | McGuire et al. | 426/557 |
| 5,057,330 | 10/1991 | Lee et al. | 426/120 |
| 5,308,632 | 5/1994 | Howard et al. | 426/460 |
| 5,312,639 | 5/1994 | Howard et al. | 426/575 |
| 5,332,587 | 7/1994 | Howard et al. | 426/557 |
| 5,573,804 | 11/1996 | Hsu | 426/496 |
| 5,599,573 | 2/1997 | Barnes et al. | 426/451 |

FOREIGN PATENT DOCUMENTS

| | | | |
|---|---|---|---|
| 626137 | 11/1994 | European Pat. Off. | 426/557 |
| 57-206350 | 12/1982 | Japan | 426/557 |
| 58-11182 | 3/1983 | Japan | 426/557 |
| 60-102158 | 6/1985 | Japan | 426/557 |
| 63-271 | 1/1988 | Japan | 426/557 |

OTHER PUBLICATIONS

Japanese Patent Abstract J54084047 Jul. 1979.
Japanese Patent Abstract J61216671 Sep. 1986.
Japanese Patent Abstract J62079763 Apr. 1987.

*Primary Examiner*—Steven Weinstein
*Attorney, Agent, or Firm*—Pennie & Edmonds LLP

[57] ABSTRACT

According to the present invention, there is provided a process for the preparation of a fully cooked shelf stable or refrigerated acidified pasta product which includes the steps of mixing pasta ingredients with an encapsulated, hot water soluble/cold water insoluble edible acid, forming the dough into a pasta, steaming the pasta a first time, then treating the steamed pasta with water, afterwards steaming the pasta a second time and finally packaging the twice steamed pasta either with heat processing or under modified atmospheric conditions.

11 Claims, No Drawings

PREPARATION OF PASTAS

BACKGROUND OF THE INVENTION

The present invention relates to the preparation of pastas and more particularly to the preparation of fully cooked, shelf-stable or refrigerated, acidified pasta products.

Current, conventional process for making shelf stable, fully cooked, acidified pastas is by making raw pastas first without acid added (either by extruding or sheeting/slitting), cooking the pastas in regular water (either by boiling or steaming/water, spraying), then dipping the cooked pastas in acidic water (or packaged with acidic water), coating with oil, packaging in bags, and followed with in-package pasteurization.

For example, U.S. Pat. No. 4,734,291 describes a process which does not use acidified water boiling for pasta cooking, but instead, regular raw/wet pastas are steamed first to give partially cooked pastas, then a certain amount of acidic water is added to the partially cooked pastas, which are finally packaged and heat processed (equivalent to 104° C. for about 10 minutes). U.S. Pat. No. 5,057,330 describes a process in which pastas are cooked by boiling, after which a certain amount of acidic water is added to the pastas which are finally packaged and heat processed and wherein alkaline neutralizing agents such as sodium bicarbonate are provided to neutralize the acid taste during consumption.

The above-mentioned patents describe processes which attempt to eliminate or reduce the cumbersome process of cooking pastas in acidic water. Ideally, direct acidification of a pasta dough without any further acidification step needed is desirable. For example, U.S. Pat. No. 4,597,976 describes a process using direct addition of acids to the pasta dough which is then formed into pasta shapes by either extrusion or sheeting/slitting, the extruded or sheeted/slitted, raw, wet or dried, acidified pastas are then cooked in regular water, the cooked pastas are then steamed to a temperature of at least 85° C., then packaged with acidified sauce and heat processed again under conditions equivalent to about 10 minutes et 93° C. Although in this process the pastas are not cooked in acidic water, a water boiling step is still used. Also, in this process the raw/wet pastas are not steamed first before boiling in order to prevent leaching of pasta starch and acid, and the absence of this steaming step, therefore, results in a reduction of pasta acidity as well as poor cooked pasta texture. There is a need for a simple process involving direct acidification of pasta dough while also retaining cooked pasta acidity and good texture.

Instead of cooking acidified, raw/wet pastas in boiling water as in the process of U.S. Pat. No. 4,597,976 we have developed a process described in copending U.S. Ser. No. 08/456161, for the preparation of a pre-cooked shelf-stable or refrigerated acidified pasta product comprising mixing pasta ingredients together with edible acid added to prepare a pasta dough, forming a raw/wet pasta from the pasta dough, steaming the raw/wet pasta a first time and then treating the steamed raw/wet pasta with water, afterwards steaming the pasta a second time and finally packaging the twice steamed pasta either with heat processing or under modified atmospheric conditions.

It is generally agreed that adding acid directly to the dough would disrupt the pasta's protein and starch matrix structure and damage the cooked pasta texture whereby the higher amount of acid added, the worse the texture. Although the texture of pastas prepared by this direct dough acidification method can be improved by adding texturizing agent such as egg white, this would also increase cost. Therefore, there remains a need for improvements in this area.

SUMMARY OF THE INVENTION

According to the present invention, there is provided a process for the preparation of a fully cooked shelf stable or refrigerated acidified pasta product comprising mixing pasta ingredients with an encapsulated, hot water soluble/cold water insoluble edible acid, forming the dough into a pasta, steaming the pasta a first time, then treating the steamed pasta with water, afterwards steaming the pasta a second time and finally packaging the twice steamed pasta either with heat processing or under modified atmospheric conditions.

DETAILED DESCRIPTION OF THE PREFERRED EMBODIMENTS

The pasta ingredients may include a dry farinaceous ingredient and water, with or without one or more additives, to form a dough. The farinaceous ingredient may be one or more of durum semolina, rice flour, buckwheat flour, durum flour, regular wheat flour, whole wheat flour, farine flour, corn flour or starch material, or any mixture thereof depending on the type of pasta product desired. Generally, semolina and durum flour are preferred for extruded pasta, such as spaghetti, macaroni, etc., while durum or wheat flour are preferred for sheeted pasta, such as noodles. The farinaceous ingredient is usually present in an amount of from about 75 to 85% of the dry ingredient mixture depending on the variety and particle size. The amount of water mixed with the farinaceous ingredient is normally from about 15 to 35% by weight based on the total weight of the dough. The temperature of the water mixed with the farinaceous ingredient may be from about 5° C. to 30° C. and more preferably from 10° C. to 25° C. The water used may be acid or alkaline and the pH is usually from about 6.5 to 7.5.

Wheat gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks and/or liquid whole eggs, may if desired, be included in the ingredient mix at levels up to about 5.5% by weight for dry products and up to about 22% by weight for liquid products, based on the weight of the dry ingredient mix. Whole eggs and egg yolks generally are used in the production of noodles, while dried egg whites are generally used in the production of spaghetti. In addition, glyceryl monostearate may, if desired, also be included in the ingredient mix, particularly in the production of extruded pasta, to improve firmness, reduce stickiness and minimize absorption of water from the sauce component by the pasta. If used, the glyceryl monostearate preferably is present in amounts of from about 0.5 to 2% by weight of the dry ingredient mix. It is to be understood that wheat gluten, eggs, and glyceryl monostearate are optional ingredients in the dry mix and are not essential in the production of the pasta component. When the pH of the water used for preparing the dough is not acidic, i.e., from about 7 to 14, it is advantageous to use a texturing agent such as propylene glycol alginate in the dry ingredient mix to obtain a pasta with an elastic and firm texture, preferably in an amount of from about 1 to 10% by weight based on the weight of the dry ingredient mix.

If desired, seasonings, spices or flavourings such as meat, chicken or beef flavors may be added to the pasta dough, e.g. in amounts of from about 0.1 to 5% by weight based on the total weight of the pasta.

The encapsulated acid that is mixed with the pasta ingredients may be any acid, organic or inorganic, which is suitable for use in foods and which is soluble in water may be used, such as citric, fumaric, lactic, malic, acetic, tartaric, hydrochloric and phosphoric acids. The acid used must not impart to the pasta a taste which is incompatible with the other components of the product at the desired pH level. Malic acid, lactic acid, citric acid, D-gluconic acid lactone and acetic acid, e.g. vinegar, have been found to be particularly well suited for use in acidification of the pasta component.

Encapsulating materials include but are not limited to hydrogenated oils, e,g, shortenings such as hydrogenated soy bean oil, regular and modified starches, maltodextrin, gelatin, mono-and di-glyceriends, silicon dioxide, caseinates, zein, gluten and gum materials.

The encapsulated acid is normally added to the dough but when the encapsulating material is a shortening it may also be added either to the water followed by the flour or mixed with the flour followed by the water.

The amount of encapsulated edible acid that is added to the pasta ingredients before steaming should be sufficient to provide the pasta with a pH of less than about 5, preferably less than 4.6 and especially from 4.0 to 4.4. The amount of edible acid present in the pasta product is usually from about 0.1 to 2.5%, preferably 0.2 to 2% and especially from 0.5 to 1.5% by weight based on the total weight of the pasta.

The dough may be formed under pressure by conventional methods such as sheeting, kneading or extrusion into a variety of pasta sizes and shapes, e.g. ravioli, spaghetti, macaroni, noodles and the like.

The pasta which is steamed the first time may be a sheeted pasta, a sheeted/slitted pasta, or an extruded pasta all of which may have been cut to the desired size.

The steaming of the pasta the first time may be carried out using saturated steam or steam at atmospheric condition, e.g. at a temperature from about 85° C. to 100° C. and conveniently from 95° C. to 100° C. for a period of from about 1 to 5 minutes, preferably from 1.5 to 3.5 minutes. The first step steaming cooks or gelatinises at least part of the surface of the pasta, e.g. at least about 50% and preferably substantially all the surface of the pasta.

The pasta steamed the first time is then treated with water in order to provide sufficient moisture to the pasta to enable subsequent cooking of the pasta by steaming a second time e.g. from about 30 to 60% by weight. The treatment with the water may be carried out using cold or hot water from just above freezing point, e.g. from about 0.5° C. up to 60° C., preferably from 15° C. to 40° C. and most preferably from 20° C. to 35° C. Ambient temperatures are the most convenient. The duration of the contact with the water may be for a period of time from, for instance, about 0.1 second to 5 minutes, preferably from 0.2 seconds to 1 minute and more preferably from 0.5 seconds to 1 minute. The treatment of the steamed pastas with the water may be performed either by spraying the pastas with the water or by immersing the pastas in the water.

After the water treatment of the pasta steamed the first time, the pasta is steamed a seond time to substantially cook the pasta. The steaming of the pasta the second time may be performed in a similar manner to steaming the first time, viz. using saturated steam or steam at atmospheric condition, e.g. at a temperature from about 85° C. to 100° C. and conveniently from 90° C. to 95° C. for a period of from about 1 to 5 minutes, preferably from 1.5 to 3.5 minutes. The moisture content of the pasta steamed a second time is usually from about 50 to 70% by weight.

Before packaging, the pastas are advantageously coated with edible oil to inhibit sticking. The oil may advantageously be coated onto the pasta by spraying. The oil should have a melting point below about 40° C., preferably below 35° C. and is advantageously a vegetable oil, e.g. soybean oil, peanut oil, olive oil, sunflower oil, safflower oil, canola oil or any combination thereof The amount of oil coated onto the pasta may be from about 0.5 to 8%, preferably from 1 to 5% and especially from 1.5 to 3% by weight based on the weight of the pasta.

The pastas are finally packaged in suitable containers, e.g. flexible plastic pouches or glass jars. After sealing, the containers may be heat processed to pasteurize the product (in-pack pasteurization) and render it shelf-stable. In accordance with the present invention, the containers may be heat processed under atmospheric conditions which provide a sterilizing value equivalent to 10 minutes at 93° C. For example, a commercially pasteurised product may be produced by processing the sealed containers for from about 10–20 minutes in hot water or steam at about 90°–95° C. Upon completion of heat processing, the containers are rapidly cooled to a temperature of about 45° C. or below in order to preserve the texture of the products.

Alternatively, after sealing, the pastas are packaged under modified atmospheric condition, preferably at ambient temperature. The modified atmosphere may comprise nitrogen alone or a mixture of nitrogen and carbon dioxide as is conventionally used, e.g. a ratio of $N_2$ to $CO_2$ of about 80:20, 65:35 or 50:50.

The present invention avoids damaging the dough structure by not adding the acid directly to the dough. Adding acid directly to the dough whether by mixing flour with acidic water or by mixing flour with acid and water reduces the texture of the dough. By adding encapsulated acids which are soluble in hot water by insoluble in cold water, the pH of the dough is initially higher than that of dough made by dissolving the same amounts and type of acid in the water which is mixed with the flour. However, after each dough is used to make pasta and is cooked, the pH of each is substantially the same, with the texture of the dough of the invention being unexpectedly better than that of the other dough.

The pastas produced by the process of the present invention retain cooked acidity and have an improved texture when compared with traditional pre-cooked/acidified pastas. Another advantage of the present invention is that because the pastas are not cooked in hot water any flavoring, seasoning or spice that is added is retained to a much greater degree that in traditional processes where cooking is performed in hot water and leaching of the flavours into the cooking water takes place.

EXAMPLES

The following Examples further illustrate the present invention:

EXAMPLE 1

7.65 kg. Durum semolina are mixed first with 2.3 kg. water in the mixer of a Mapimpianti pasta extruder and then with 50 g. malto-dextrin encapsulated citric acid powder (Balchem Corp's C-M100-70). This dough is then extruded into a Cellentini shaped pasta and passed through a steaming/water spraying tunnel for 3 min. (98°–99° C. temp). The steam cooked pastas are then rinsed in cold water for 30 sec, mixed with 2% vegetable oil, packaged as 100 g. pastas in a plastic pouch and then in-package pasteurized for 40 min. (95° C.), at a pH of 5.1. This pasta sample has a firm and elastic texture after 15 sec. heating in boiling water.

Comparative Example A 35 g. citric acid (equal to the amount of acid in 50 g malto-dextrin encapsulated citric acid used in Example 1) are dissolved in 2.3 kg water first, then mixed with 7.65 kg. Durum semolina. This dough is then used to make acidified, cooked pastas following the procedure described in Example 1. The pH of this pasta is also 5.1, but the pasta texture is poor, it has a short bite and is not elastic.

Comparative Example B

A similar procedure to that described in Comparative Example A is carried out using the same type and amount of ingredients, but the addition sequence of ingredients is different. Instead of adding citric acid powder to water first, and then mixing with flour, water is mixed with flour first, and then mixed in citric acid powder. The pH of this pasta is also 5.1, but the pasta texture is better than the texture of the pasta prepared in Comparative Example A but not as good as the texture of pasta prepared in Example 1.

A textural measurement is conducted as follows to compare samples of Example 1, and Comparative Examples A and B: 100 g of pastas are heated in 700 ml boiling water for 15 sec, then 50 g of these pastas are placed in a Kramer shear press cell and the pasta firmness is measured by a textural analyzer (Texture Technology, Inc.). The test results show;

| Samples | Pasta Firmness |
| --- | --- |
| Example 1 | 5.65 kg |
| Comparative Example A | 4.75 kg |
| Comparative Example B | 5.03 kg |

These test results confirm the finding in tasting evaluation which show that the less acid contacted with dough during dough formation stage, the better the pasta texture i.e., firmness, that the use of encapsulated acids is very effective.

EXAMPLE 2

1 kg Durum flour is mixed first with 450 g water and then with 7 g malto-dextrin encapsulated citric acid (Loders Crolaan's Durkote citric acid ML-70E, 70% citric acid). The pH of the dough is measured. Then the dough is sheeted into 0.040" thickness and slitted into 0.060" width. The pastas are steamed at 98°–99° C. for 3 min, sprayed with water and steamed again for 2 min.

Comparative Example C

A similar procedure to that described in Example 2 is carried out except that the encapsulated acid powder is dissolved in water first and then mixed with flour into dough, followed by sheeting and slitting into pastas. A comparison of Example 2 & Comparative Example C shows the following results:

| | Dough pH | Steam Cooked Pasta pH | Cooked Pasta texture |
| --- | --- | --- | --- |
| Example 2 | 6.5 | 4.6 | Firm |
| Comparative Example C | 5.3 | 4.5 | Soft, mealy |

These examples again confirm the finding in Example 1 which shows mixing of malto-dextrin encapsulated citric acid powder to the dough can produce a pasta with better texture than the pasta produced from the dough prepared by mixing flour with acid solution.

EXAMPLE 3

1 kg Durum flour is mixed first with 450 g water and then with 18 g modified starch spray dried lactic acid (Kerry Ingredients' Naturetone 3463, 20% lactic acid). The pH of the dough is measured. Then the dough is sheeted into 0.040" thickness and slitted into 0.060" width. The pastas are then steamed at 98°–99° C. for 3 min, sprayed with water and steamed again for 2 min.

Comparative Example D

A similar procedure to that described in Example 3 is carried out except that the spray dried powder is dissolved in water first, then mixed with flour into dough and afterwards sheeted and slitted into pastas.

A comparison of Example 3 and Comparative Example D shows the following results:

| | Dough pH | Steam Cooked Pasta pH | Cooked Pasta texture |
| --- | --- | --- | --- |
| Example 3 | 5.4 | 4.5 | Firm, Elastic |
| Comparative Example D | 5.0 | 4.6 | Soft, mealy |

EXAMPLE 4

1 kg Durum flour is mixed first with 450 g water and then with 6 g maltodextrin encapsulated malic acid (Loders Croklaan's Durkote malic acid MC-90, 90% malic acid). The pH of the dough is measured. Then the dough is sheeted into 0.040" thickness and slitted into 0.060" width. The pastas are steamed at 98°–99° C. for 3 min., sprayed with water and steamed again for 2 min.

Comparative Example E

A similar procedure to that described in Example 4 is carried out except that the encapsulated acid is dissolved in water first, then mixed with flour into dough and afterwards sheeted and slitted into pastas. A comparison of Example 4 and Comparative Example E shows the following results:

| | Dough pH | Steam Cooked Pasta pH | Cooked Pasta texture |
| --- | --- | --- | --- |
| Example 4 | 5.6 | 4.1 | Fair |
| Comparative Example E | 4.4 | 3.6 | Soft, Gummy |

EXAMPLE 5

1 kg Durum flour is mixed first with 450 g water first and then with 30 g shortening encapsulated D-gluconic acid lactone (Balchem's GDL-140-70). The pH of the dough is measured. Then the dough is sheeted into 0.040" thickness and slitted into 0.060" width. The pastas are steamed at 98°–99° C. for 3 min, sprayed with water and steamed again for 2 min.

Comparative Example F

A similar procedure to that described in Example 5 is carried out except that the shortening encapsulated D-gluconic acid lactone is dissolved in water first by boiling (pH 2.4), then mixed with flour into the dough, sheeted and slitted into pastas. The pastas are then steamed. A comparison of Example 5 and Comparative Example F shows the following results.

|            | Dough pH | Steam Cooked Pasta pH | Cooked Pasta texture |
| --- | --- | --- | --- |
| Example | 6.0 | 4.4 | Firm & Elastic |
| Comparative Example F | 5.2 | 4.4 | Soft |

EXAMPLE 6

Dissolve 50 parts 200 bloom gelatin in 300 parts warm water at 100° F. (38° C.) first, then add in 20 parts lactic acid (90%), mix well, spread into thin layer and let it set and dry, then grind into powder (gelatin encapsulated lactic acid). 1 kg. Durum flour is mixed first with 450 g water and then with 20 g of the gelatin encapsulated lactic acid powder. The pH of the dough is measured. Then the dough is sheeted into 0.040" thickness and slitted into 0.060" width. The pastas are steamed at 98°–99° C. for 3 min, sprayed with water and steamed again for 2 min.

Comparative Example G

A similar procedure to that described in Example 6 is carried out except that the gelatin encapsulated lactic acid powder is placed in cold water first (pH 3.3), then heated to boiling (pH 2.4), mixed with flour dough and afterwards sheeted and slitted into pastas. A comparison of Example 6 and Comparative Example G shows the following results:

|            | Dough pH | Steam Cooked Pasta pH | Cooked Pasta texture |
| --- | --- | --- | --- |
| Example 6 | 6.6 | 4.2 | Firm & Elastic |
| Comparative Example G | 5.2 | 4.5 | Soft & Mealy |

EXAMPLE 7

1 kg Durum flour is mixed first with 450 g water and then with 15 g lactic acid powder coated on silicon dioxide (Seafla's Dry lactic acid #F-1085-1). The pH of the dough is measured. Then the dough is sheeted into 0.040" thickness and slitted into 0.060" width. The pastas are steamed at 98°–99° C. for 3 min, sprayed with water and steamed again for 2 min.

Comparative Example H

A similar procedure to that described in Example 7 is carried out except that the lactic acid coated on silicon dioxide is placed in water, then mixed with flour into dough and afterwards sheeted and slitted into pastas. A comparison of Example 7 and Comparative Example H shows the following results:

|            | Dough pH | Steam Cooked Pasta pH | Cooked Pasta texture |
| --- | --- | --- | --- |
| Example 7 | 6.1 | 4.3 | Firm |
| Comparative Example H | 4.8 | 3.9 | Soft & Mealy |

EXAMPLE 8

1 kg Durum flour is mixed first with 450 g water and then with 8 g partially hydrogenated soyben oil encapsulated citric acid (Balchem's C-165-63, 63% citric acid). The pH of the dough is measured. Then the dough is sheeted into 0.040" thickness and slitted into 0.060" width. The pastas are steamed at 98°–99° C. for 3 min, sprayed with water and steamed again for 2 min.

Comparative Example I

A similar procedure to that described in Example 8 is carried out except that the shortening encapsulated citric acid powder is placed in water first (pH 5.9), heated to boiling (pH 1.7), then mixed with flour into dough and afterwards sheeted and slitted into pastas. A comparison of Example 8 and Comparative Example I shows the following results:

|            | Dough pH | Steam Cooked Pasta pH | Cooked Pasta texture |
| --- | --- | --- | --- |
| Example 8 | 5.7 | 4.1 | Firm |
| Comparative Example I | 4.9 | 4.4 | Soft & Gummy |

EXAMPLE 9

995 g Durum flour are mixed first with 5 g propylene glycol alginate Kelco's Kolcoloid HVF) first, and then with 420 g water with pH Of 12.7 (mixture of 12 parts 0.2N NaOH soln. and 30 parts water). After the dough is made, 15 g shortening encapsulated citric acid (Balchem's C-140-85) are added to the dough and mixed. The pH of dough is 7.5. The dough is then sheeted into 0.040" thickness and slitted into 0.060" width. The pastas are steamed at 98°–99° C. for 3 min, sprayed with water and steamed again for 2 min. The cooked pastas are then dipped into 1% lactic acid solution for 1 min then mixed with 2% vegetable oil, packaged 100 g pastas in a plastic pouch, then in-package pasteurized for 40 min (95° C.).

Comparative Example J

A similar procedure to that described in Example 9 is carried out except that the shortening encapsulated citric acid is dissolved in NaOH soln. first (by heating, pH 2.3), then this solution is mixed with the Durum flour and propylene glycol alginate. The pH of the dough is measured. Following the procedure described in example 9, the acidified cooked pastas are prepared.

Comparison of Example 9 and Comparative Example J shows the following results:

|            | Dough pH | Steam Cooked Pasta pH | Cooked Pasta texture |
| --- | --- | --- | --- |
| Example 9 | 7.5 | 4.5 | Firm & elastic |
| Comparative Example J | 4.6 | 4.4 | Soft & mealy |

What is claimed is:

1. A process for the preparation of a fully cooked shelf stable or refrigerated acidified pasta product comprising mixing pasta ingredients including water to form a pasta dough, mixing with the formed dough an encapsulated edible acid which has been made hot water soluble/cold water insoluble by the encapsulation the encapsulated edible acid being present in an amount sufficient to provide the pasta with a pH of less than about 5, then steaming the pasta for a first time sufficient to cook or gelatinize at least part of the surface of the pasta, treating the steamed pasta with water in an amount sufficient to provide sufficient moisture to the pasta to enable subsequent cooking of the pasta, afterwards steaming the pasta for a second time sufficient to substantially cook the pasta, and finally packaging the twice steamed pasta to provide a pasta product.

2. A process according to claim 1 wherein the acid is malic acid, lactic acid, citric acid or D-gluconic acid lactone.

3. A process according to claim 1 wherein the acid is encapsulated with an encapsulating material and the encapsulating material is a hydrogenated oil, a regular or modified starch, maltodextrin, gelatin, a mono-or di-glyceride, silicon dioxide, a caseinate, zein, gluten or a gum material.

4. A process according to claim 1 wherein the amount of encapsulated acid that is added to the pasta dough before steaming is sufficient to provide a pasta with a pH less than 4.6.

5. A process according to claim 1 wherein the amount of encapsulated acid that is present in the pasta product is from about 0.1 to 2.5% by weight based on the total weight of the pasta.

6. A process according to claim 1, wherein the first steaming is carried out at a temperature of about 85° to 100° for a period of about 1 to 5 minutes using steam or saturated steam.

7. A process according to claim 1 wherein the steamed pasta water treating is carried out by contacting the steamed pasta for a period of about 0.1 seconds to 5 minutes with water having a temperature of about 0.5° C. to 60° C.

8. A process according to claim 1 wherein the second steaming is carried out at a temperature of about 85° to 100° for a period of about 1 to 5 minutes using steam or saturated steam.

9. A process according to claim 1 which further comprises coating the twice steamed pasta with an edible oil prior to packaging to inhibit sticking.

10. A process according to claim 1 wherein the packaging step packages the twice steamed pasta in a flexible plastic pouch to form a packaged product and which further comprises pasteurizing the packaged product to render the pasta shelf stable.

11. A process according to claim 1 wherein the packaging step includes packaging the twice steamed pasta under modified atmospheric conditions at ambient temperature with nitrogen or a mixture of nitrogen and oxygen.

* * * * *